(12) United States Patent
Yamaoka et al.

(10) Patent No.: US 10,774,772 B2
(45) Date of Patent: Sep. 15, 2020

(54) VEHICLE CONTROL DEVICE

(71) Applicant: HITACHI AUTOMOTIVE SYSTEMS, LTD., Ibaraki (JP)

(72) Inventors: Shirou Yamaoka, Hitachinaka (JP); Ryo Kusakabe, Hitachinaka (JP); Kiyotaka Ogura, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/769,280

(22) PCT Filed: Oct. 13, 2016

(86) PCT No.: PCT/JP2016/080330
§ 371 (c)(1),
(2) Date: Apr. 18, 2018

(87) PCT Pub. No.: WO2017/069032
PCT Pub. Date: Apr. 27, 2017

(65) Prior Publication Data
US 2018/0306137 A1    Oct. 25, 2018

(30) Foreign Application Priority Data
Oct. 20, 2015  (JP) ................. 2015-205980

(51) Int. Cl.
*F02D 41/20* (2006.01)
*F02D 41/40* (2006.01)
(Continued)

(52) U.S. Cl.
CPC ............ *F02D 41/20* (2013.01); *F02D 41/32* (2013.01); *F02D 41/38* (2013.01); *F02D 41/402* (2013.01);
(Continued)

(58) Field of Classification Search
CPC .......... F02D 41/20; F02D 41/32; F02D 41/38; F02D 41/40; F02D 41/402; F02D 45/00; F02M 51/06
(Continued)

(56) References Cited

U.S. PATENT DOCUMENTS 5,992,391 A * 11/1999 Yamakado .............. F02D 41/20
123/490
6,332,453 B1 * 12/2001 Yamakado .............. F02D 41/20
123/490
(Continued)

FOREIGN PATENT DOCUMENTS

EP       1013920 A2    6/2000
JP    2010-041800 A    2/2010
(Continued)

OTHER PUBLICATIONS

International Search Report for WO 2017/069032 A1, dated Jan. 31, 2017.
(Continued)

*Primary Examiner* — John Kwon
*Assistant Examiner* — Johnny H Hoang
(74) *Attorney, Agent, or Firm* — Volpe ansd Koenig, P.C.

(57) ABSTRACT

In view of the foregoing issues, an object of the present invention is to provide a vehicle control device that reduces the constraints of heat generation and charging time of a booster circuit, and decreases favorably the fuel consumption and exhaust emission of an engine. A vehicle control device installed in a vehicle, the device includes: a battery; a high-voltage battery that has a voltage higher than a voltage of the battery; and a fuel injection device that injects fuel into an internal combustion engine, wherein the vehicle control device includes a control unit that determines whether to supply a drive current to the fuel injection device
(Continued)

by the battery or supply a drive current to the fuel injection device by the high-voltage battery, and controls the fuel injection device.

16 Claims, 4 Drawing Sheets

(51) Int. Cl.
    *F02M 51/06*     (2006.01)
    *F02D 41/32*     (2006.01)
    *F02D 41/38*     (2006.01)
    *F02D 45/00*     (2006.01)
    *B60W 10/06*     (2006.01)

(52) U.S. Cl.
    CPC .............. *F02D 45/00* (2013.01); *F02M 51/06* (2013.01); *B60W 10/06* (2013.01); *F02D 2041/2003* (2013.01); *F02D 2041/2013* (2013.01); *F02D 2041/2017* (2013.01); *F02D 2250/38* (2013.01); *F02D 2400/16* (2013.01)

(58) Field of Classification Search
    USPC ........................................ 123/478–478, 490
    See application file for complete search history.

(56) References Cited

U.S. PATENT DOCUMENTS

| | | | |
|---|---|---|---|
| 2005/0119819 A1* | 6/2005 | Stevens | F02D 41/20 |
| | | | 701/104 |
| 2012/0116654 A1 | 5/2012 | Toyohara et al. | |
| 2014/0069389 A1* | 3/2014 | Nishimura | F02D 41/20 |
| | | | 123/478 |
| 2016/0047330 A1* | 2/2016 | Mukaihara | F02D 41/20 |
| | | | 123/472 |
| 2016/0108847 A1* | 4/2016 | Nakano | F02D 41/20 |
| | | | 123/490 |
| 2016/0363076 A1* | 12/2016 | Kojima | F02D 41/20 |
| 2017/0152803 A1* | 6/2017 | Kusakabe | F02D 41/20 |
| 2017/0335787 A1* | 11/2017 | Aono | F02D 41/20 |
| 2018/0017005 A1* | 1/2018 | Kusakabe | F02D 41/20 |
| 2018/0320620 A1* | 11/2018 | Satake | F02D 41/20 |

FOREIGN PATENT DOCUMENTS

| | | |
|---|---|---|
| JP | 2012-097693 A | 5/2012 |
| JP | 2014-055570 A | 3/2014 |
| JP | 2015-113791 A | 6/2015 |

OTHER PUBLICATIONS

Extended European Search Report dated Jun. 4, 2019 for the European Patent Application No. 16857347.5.

* cited by examiner

VEHICLE CONTROL DEVICE

TECHNICAL FIELD

The present invention relates to a vehicle control device, in particular to a drive device that drives a fuel injection device used for an internal combustion engine such as a gasoline engine.

BACKGROUND ART

In general, a control device for an electromagnetic fuel injection device boosts the voltage of a battery (for example, 14 V) by a booster circuit in a drive device to cause a quick transition from valve-closed to valve-opened states, and supplies high power to the fuel injection device in a short period of time in accordance with a fuel injection pulse signal. In order to reduce engine fuel consumption and exhaust emission, there has been currently applied a technique for implementing favorable air-fuel mixture distribution by multiple-stage injection control under which a plurality of fuel injections is performed in one cycle of the engine. The application of the multiple-stage injection control leads to increase in the number of times the booster circuit boosts the voltage per unit time, which may deteriorate the durability and reliability of the drive device due to heat generated by the circuit or the like. As a means to solve this problem, PTL 1 describes a technique by which to control and suppress a current peak value for driving the fuel injection device depending on the conditions for engine speed, the temperature status of the drive device equipped with the booster circuit, and the like.

CITATION LIST

Patent Literature

PTL 1: JP 2010-418000 A

SUMMARY OF INVENTION

Technical Problem

According to the technique described in PTL 1, the current (peak) amount for driving the fuel injection device is decreased in the operating range of the engine without the need for high drive current or in the case where there is a concern of a high temperature of the drive device, thereby to avoid excessive heat generation. However, in the high-speed and high-load range of the engine requiring a large amount of fuel injection per unit time, it is necessary to utilize multiple-stage injections to avoid soot and abnormal combustion. Under such conditions, engine performance may become deteriorated.

In addition, the booster circuit is basically configured to charge power into a capacitor or the like and perform switching control on the capacitor to boost the voltage. Accordingly, it takes a predetermined charging time between the end of one injection and the start of the next injection. In the engine high-speed range, in particular, it is not possible to ensure the number of multiple-stage injections and injection timing necessary for generation of a favorable air-fuel mixture under the constraint of the charging time.

In view of the foregoing issues, an object of the present invention is to provide a vehicle control device that reduces the constraints of the heat generation and the charging time of the booster circuit, and decreases favorably the fuel consumption and exhaust emission of the engine.

Solution to Problem

To achieve the above object, the present invention is a vehicle control device installed in a vehicle, the device including: a battery; a high-voltage battery that has a voltage higher than a voltage of the battery; and a fuel injection device that injects fuel into an internal combustion engine, wherein the vehicle control device includes a control unit that determines whether to supply a drive current to the fuel injection device by the battery or supply a drive current to the fuel injection device by the high-voltage battery, and controls the fuel injection device.

Advantageous Effects of Invention

According to the present invention, it is possible to provide a vehicle control device that reduces the constraints of heat generation and charging time of the booster circuit, and decreases favorably the fuel consumption and exhaust emission of the engine.

Other configurations, operations, and effects of the present invention will be described in detail in relation to the following examples.

DESCRIPTION OF EMBODIMENTS

Examples of the present invention will be described below in detail with reference to the drawings.

Example 1

A fuel injection system including a fuel injection device and a drive device according to the present invention will be described with reference to FIGS. 1 and 2.

Figure 1:
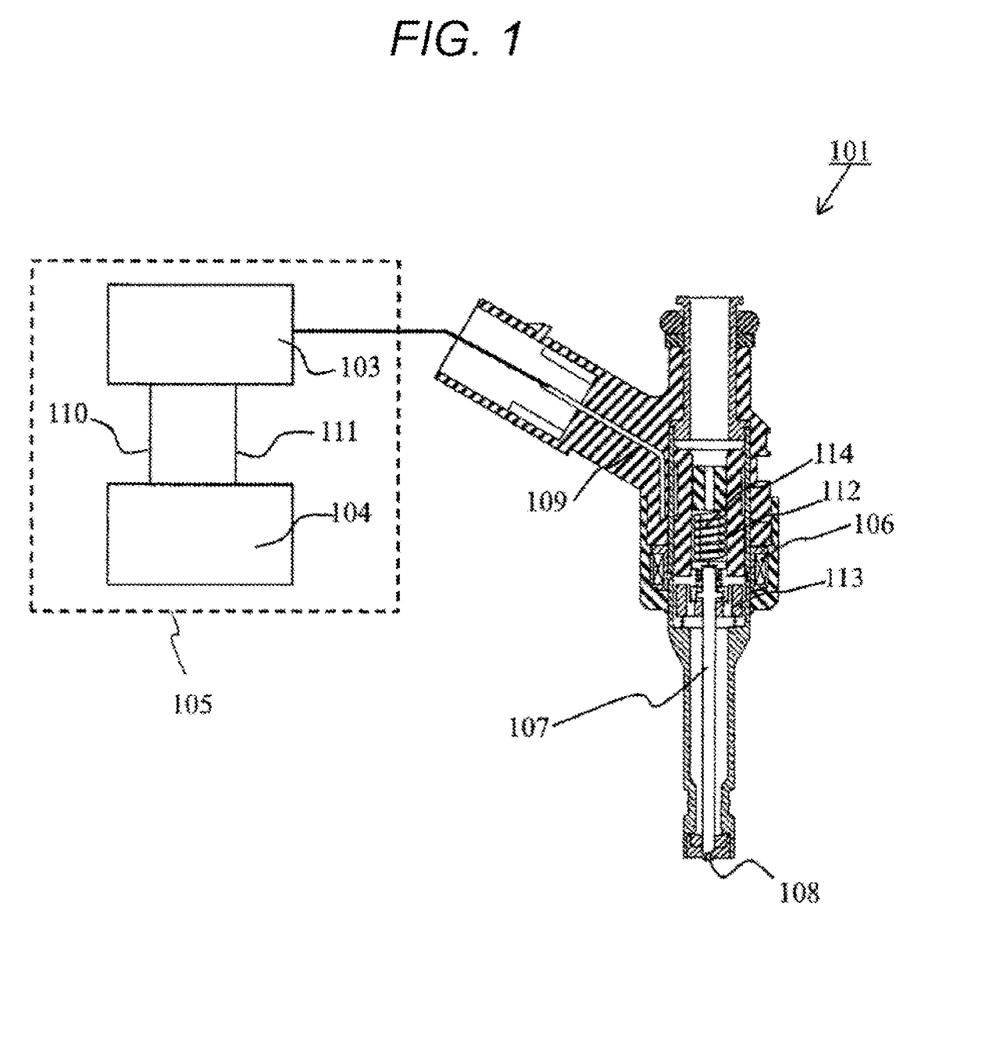
FIG. 1 is a vertical cross-sectional view of a fuel injection device according to the present invention, illustrating a connection configuration of a drive circuit and an engine control unit (ECU) connected to the fuel injection device.

FIG. 1 is a vertical cross-sectional view of a fuel injection device, illustrating an example of configuration of a drive circuit 103 and an ECU 104 for driving a fuel injection device 101 (fuel injection valve). The fuel injection from the fuel injection device 101 is controlled by the width of an injection pulse sent by the engine control unit (ECU) 104. The injection pulse is input into the drive circuit 103 of the fuel injection device 101. The drive circuit 103 decides a drive current waveform based on instructions from the ECU 104, and supplies the drive current waveform to the fuel injection device 101 for a period of time based on the injection pulse. The drive circuit 103 may be implemented as a component or a substrate integrated with the ECU 104. The device in which the drive circuit 104 and the ECU 104 are integrated will be called a drive device 105.

The ECU 104 captures signals indicating the engine state from various sensors, and calculates the width of the injection pulse and the injection timing for controlling the amount of injection from the fuel injection device under the operating conditions of the internal combustion engine. The ECU 104 also includes an A/D converter and an I/O port for capturing signals from the various sensors. The injection pulse output from the ECU 104 is input into the drive circuit 103 of the fuel injection device through a signal line 110. The drive circuit 103 controls the voltage to be applied to a solenoid 106 and supplies current to the solenoid 106. The ECU 104 can communicate with the drive circuit 103 through a communication line 111 to switch between drive currents generated by the drive circuit 103 and change the setting values of electric current and time depending on the pressure of the fuel to be supplied to the fuel injection device 101 and the operating conditions.

The fuel injection device 101 includes a valve body 107 that opens and closes an injection hole 108, a spring 114 that biases the valve body 107 in a valve-closing direction, and a fixed core 112 that aspirates a mover 113 by magnetic attractive force. The mover 113 is provided separately from the valve body 107 and forms a magnetic circuit with application of voltage to the solenoid 106. Accordingly, the mover 113 is aspirated by the fixed core 112 to drive the valve body 107 in a valve-opening direction.

Next, a configuration of the drive device 105 of the fuel injection device 101 according to a first example of the present invention will be described with reference to FIG. 2. FIG. 2 is a diagram illustrating a detailed configuration of the drive circuit 103 and the ECU 104 of the fuel injection device illustrated in FIG. 1.

A CPU 501 is built in the ECU 104, for example, to capture signals indicating the engine state from a fuel pressure sensor attached to a fuel pipe upstream of the fuel injection device, an air flow sensor measuring the amount of air flowing into an engine cylinder, an air-fuel ratio sensor detecting the air-fuel ratio of an exhaust gas emitted from the engine cylinder, a crank angle sensor, and the like, and calculate the width of an injection pulse and injection timing for controlling the amount of injection from the fuel injection device depending on the operating conditions of the internal combustion engine. The CPU 501 also calculates an appropriate injection pulse width Ti (that is, the amount of injection) and injection timing depending on the operating conditions of the internal combustion engine, and outputs the injection pulse width Ti to a drive IC 502 of the fuel injection device through a communication line 504. After that, the CPU 501 supplies a drive current to a fuel injection device 540 while switching between the energization and non-energization of switching elements 505, 506, and 507 by the drive IC 502.

The switching element 505 is connected between a high-voltage power source higher in voltage than a voltage source VB input into the drive circuit 103 and a high-voltage side terminal of the fuel injection device 540. The switching elements 505, 506, and 507 are formed from FETs, transistors, or the like, for example, and can switch between the energization and non-energization of the fuel injection device 540. A boosted voltage VH1 as an initial voltage value of the high-voltage power source is about 60 V, for example, and is generated by boosting the battery voltage with a booster circuit 514. The booster circuit 514 may be formed from a DC/DC converter or the like, or formed from a coil 530, a transistor 531, a diode 532, and a capacitor 533. In the latter case of the booster circuit 514, when the transistor 531 is turned on, the battery voltage VB flows toward a around potential 534, and when the transistor 531 is turned off, a high voltage generated in the coil 530 is rectified through the diode 532 and the electric charge is accumulated in the capacitor 533. The transistor is repeatedly turned on and off until the boosted voltage VH1 is reached to increase the voltage of the capacitor 533. The transistor 531 is connected to the IC 502 or the CPU 501 so that the IC 502 or the CPU 501 detects the boosted voltage VH1 output from the booster circuit 514.

This example is characterized in providing a high-voltage power source 601 that supplies a high voltage VH2 separately from the boosted voltage VH1 generated by the booster circuit 514, and providing a switch 600 capable of switching between the voltages VH1 and VH2.

An object of this example is to provide a drive device for a fuel injection device to reduce the constraints of heat generation and charging time of the booster circuit, and implement an optimum multiple-stage injection control at the engine. To this end, necessary drive power is supplied to the fuel injection device 101 by switching between the battery and the high-voltage battery (the high-voltage power source 601). At that time, the switch 600 for switching to the power supply by the high-voltage battery (the high-voltage power source 601) is desirably provided downstream of the booster circuit 514 boosting the voltage of the battery.

That is, the vehicle control device (the ECU 104) of this example is installed in a vehicle including the battery, the high-voltage battery (the high-voltage power source 601) higher in voltage than the voltage of the battery, and the fuel injection device 101 injecting fuel into the internal combustion engine. The control unit (the CPU 501) of the vehicle control device (the ECU 104) determines whether to supply a drive current to the fuel injection device 101 by the battery or supply a drive current to the fuel injection device 101 by the high-voltage battery (the high-voltage power source 601), and controls the fuel injection device 101. The vehicle with the vehicle control device (the ECU 104) of this example is provided with the switch 600 for switching between the supply of a drive current to the fuel injection device 101 by the battery and the supply of a drive current to the fuel injection device 101 by the high-voltage battery (the high-voltage power source 601) on the downstream of the booster circuit 514 boosting the voltage of the battery. The control unit (the CPU 501) controls the switch 600 to control the fuel injection device 101 by supplying a drive current to the fuel injection device 101 by the battery or supplying a drive current to the fuel injection device 101 by the high-voltage battery (the high-voltage power source 601).

This is intended to connect the high-voltage battery (the high-voltage power source 601) downstream of the booster circuit 514 in addition to the battery power generally supplied to the drive circuit 103, and switch to the power supply by the high-voltage battery (the high-voltage power source 601) under conditions requiring multiple-stage injections without the intervention of the booster circuit 514. This makes it possible to perform a multiple-stage fuel injection control without the constraints of heat generation and charging time of the booster circuit 514, thereby to reduce favorably engine fuel consumption and exhaust emission.

The general battery voltage at that time is about 14 V and is boosted to 50 to 70 V for driving the fuel injection device 101. Accordingly, setting the voltage of the high-voltage battery (the high-voltage power source 601) preferably to 24 to 60 V and connecting the high-voltage battery downstream of the booster circuit 514 would eliminate the need to add special changes to the further downstream circuits or the drive device.

In this configuration, the fuel injection device 101 is driven with a switchover between different voltages from the plurality of batteries, and it is necessary to have a plurality of driving maps for fuel injection pulses or the like for the supplied batteries. That is, the vehicle control device (the ECU 104) controls the fuel injection device 101 by the driving maps different between a fuel injection pulse signal for supplying a drive current to the fuel injection device 101 by the battery and a fuel injection pulse signal for supplying a drive current to the fuel injection device 101 by the high-voltage battery (the high-voltage power source 601). Therefore, the memory and register in the vehicle control device (the ECU 104) store the plurality of driving maps.

It is desirable that there is not a booster circuit such as a circuit generating the high voltage VH1 between the high-voltage power source 601 and the switch 600. This is because some energy loss may be caused by the actions of the transistor 531 and the capacitor 533 in the voltage boosting control of the booster circuit 514, which brings about problems such as failure and durability degradation due to heat generation of the booster circuit 514. To prevent these problems under present circumstances, it is necessary to take measures such as setting a limit on the number of fuel injections in one cycle of the engine and keeping a predetermined period of time or more of interval between injections.

This example is to solve this issue by implementing high-voltage power source driving of the fuel injection device 101 by the high-voltage power source 601 or using in combination with supply of the high voltage VH1 from the booster circuit 514 (switching between the voltages). The high-voltage power source 601 is desirably a power source that can supply voltage and power necessary for the fuel injection device 101 to operate favorably and has a voltage of about 24 to 60 V, for example. The high-voltage power source 601 may be configured to, when the fuel injection device 101 is installed in an electric hybrid automobile or the like, for example, use entirely or partially the automobile's voltage source to supply the voltage of about 24 to 60 V described above. The switch 600 desirably has a function of switching among electric signals in a plurality of paths, such as a transistor or a MOS-FET.

A diode 535 is provided between a power source-side terminal 590 of the solenoid 106 and the switching element 505 so that current from the booster circuit 514 or the high-voltage power source 601 flows toward the solenoid 106 and a ground potential 515. In addition, a diode 511 is provided between the power source-side terminal 590 of the solenoid 106 and the switching element 507 so that current from the battery voltage source flows toward the solenoid 106 and the installation potential 515. Accordingly, while the switch element 508 is energized, no current flows from the ground potential 515 toward the solenoid 106 and the voltage sources.

The ECU 104 contains a register and a memory to store numerical data necessary for control of the engine such as calculation of the injection pulse width. The register and memory are included in the drive device 105 or the CPU 501 of the drive device 105. The switching element 507 is connected between a low-voltage power source and the high-voltage terminal of the fuel injection device. The low-voltage power source VB is, for example, battery voltage and supplies a battery voltage of about 12 to 14 V. The switching element 506 is connected between the low-voltage side terminal of the fuel injection device 540 and the ground potential 515.

The drive IC 502 detects the value of a current flowing through the fuel injection device 540 by current detection resistors 508, 512, and 513, and switches between the energization and non-energization of the switching elements 505, 506, and 507 to generate a desired drive current. The diodes 509 and 510 are provided to apply inverse voltages to the solenoid 106 of the fuel injection device to reduce quickly the current supplied to the solenoid 106. The CPU 501 communicates with the drive IC 502 through a communication line 503 to switch between the generated drive currents by the drive IC 502 depending on the pressure of the fuel supplied to the fuel injection device 540 (101) and operating conditions. The both ends of the resistors 508, 512, and 513 are connected to A/D conversion ports of the IC 502 to detect the voltages applied to the both ends of the resistors 508, 512, and 513 by the IC 502.

In this configuration, it is possible to supply the voltage necessary for operations of the fuel injection device 101 by enabling a switchover from the booster circuit 514 supplying the battery voltage to the high-voltage power source 601, thereby to reduce energy loss due to the voltage boosting in the booster circuit 514. As a result, it is possible to implement the fuel injection device that enables a plurality of injection controls necessary for reduction of the fuel consumption and exhaust emission of the engine under less influence of heat generation in the drive device 105 leading to failure or durability degradation.

Figure 3:
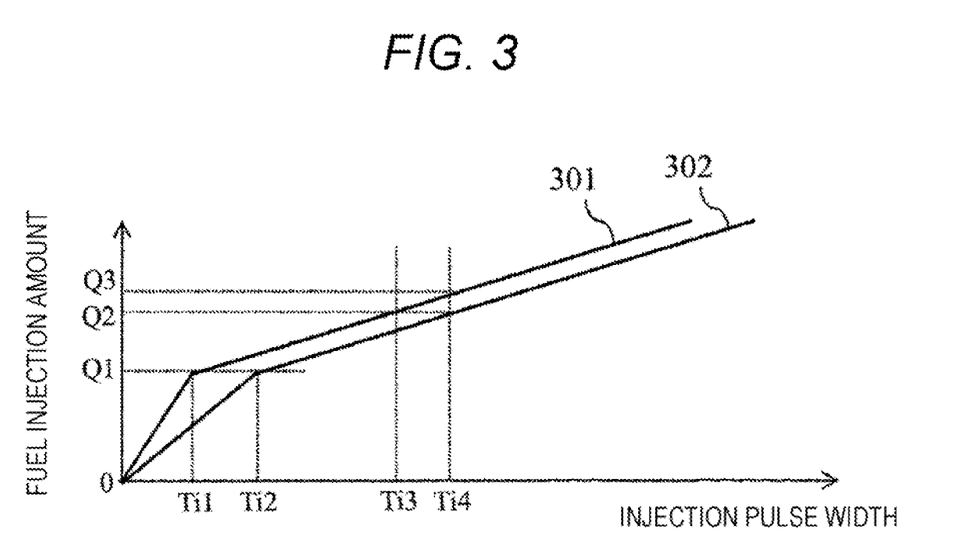
FIG. 3 is a diagram illustrating an example of characteristics of injection pulse and fuel injection amount according to the present invention.

FIG. 3 illustrates the characteristics of the injection pulse width and the fuel injection amount in the case of driving the fuel injection device with power supply from the foregoing two power sources in this example. Line 301 is a characteristic line of the fuel injection pulse width and the fuel injection amount in the case of performing fuel injection with power supply from the booster circuit 514 of the battery voltage, and line 302 is a characteristic line of the injection pulse width and the fuel injection amount in the case of performing fuel injection with power supply from the high-voltage power source 601. These characteristics are assumed as under the same fuel pressure and preset in the ECU 104.

Figure 2:
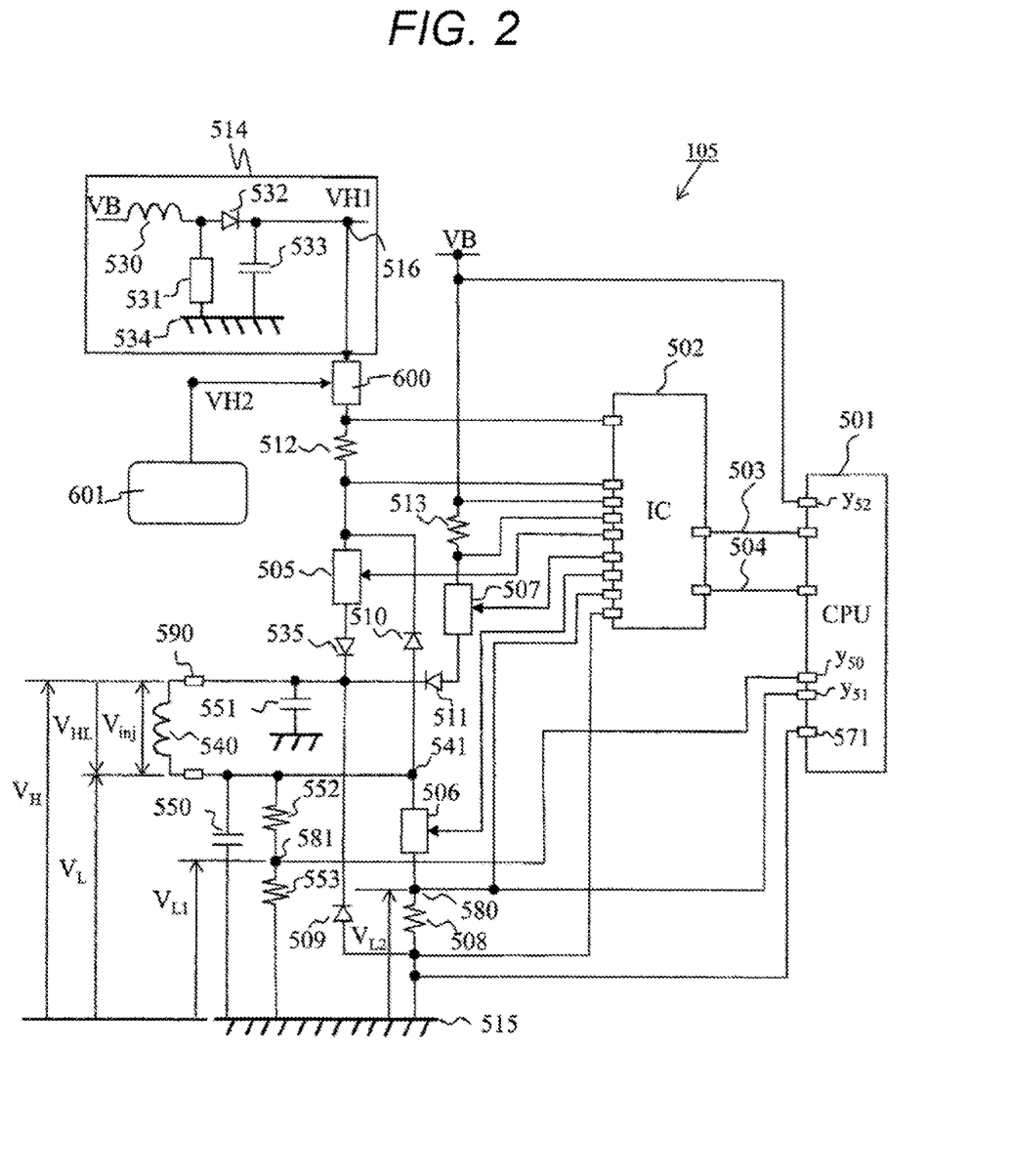
FIG. 2 is a diagram illustrating an internal configuration of a drive device and the engine control unit (ECU) in the fuel injection device according to the present invention.

When the injection pulse is input from the drive device 105 into the fuel injection device 101 as illustrated in FIG. 2, the voltage of the booster circuit 514 or the high-voltage power source 601 is first applied to the coil to start up quickly the current and generate swiftly magnetic flux in the magnetic circuit. When the boosted voltage VH1 or VH2 is applied until the valve body 107 reaches the fixed core 112, the magnetic attractive force increasingly acts on the mover 113 and the gradient of the displacement of the valve body grows with respect to the time.

In this example, the general battery voltage VB (about 14 V) is boosted by the booster circuit 514 such that the VH1 is about 50 to 70 V (desirably 60 V or more) to drive the fuel injection device 101, and the high-voltage power source applies the voltage VH2 of 24 to 60 V to drive the fuel injection device 101, thereby VH1 is higher than VH2. Accordingly, when the mover reaches the full-lift position, the injection pulse widths with an injection amount Q1 are Ti1 and Ti2 in the characteristics set in the ECU 104, and Ti1 is smaller than Ti2.

In the injection characteristics after the full lift as well, the injection amounts are Q2 and Q3 with the same injection pulse width Ti4, and Q3 is larger than Q2. For example, when the ECU 104 detects the engine operating conditions from signals from various sensors and the like and determines that multiple-stage injection is necessary, the fuel injection device is driven by the high-voltage power source 601 without the intervention of the booster circuit in accordance with the characteristics of the line 402. It is indisputable that, as for the actual amount of fuel injection, the pulse width is corrected with respect to the pulse width based on the characteristics by the engine air-fuel ratio control or the like within the scope of this example.

Figure 4:
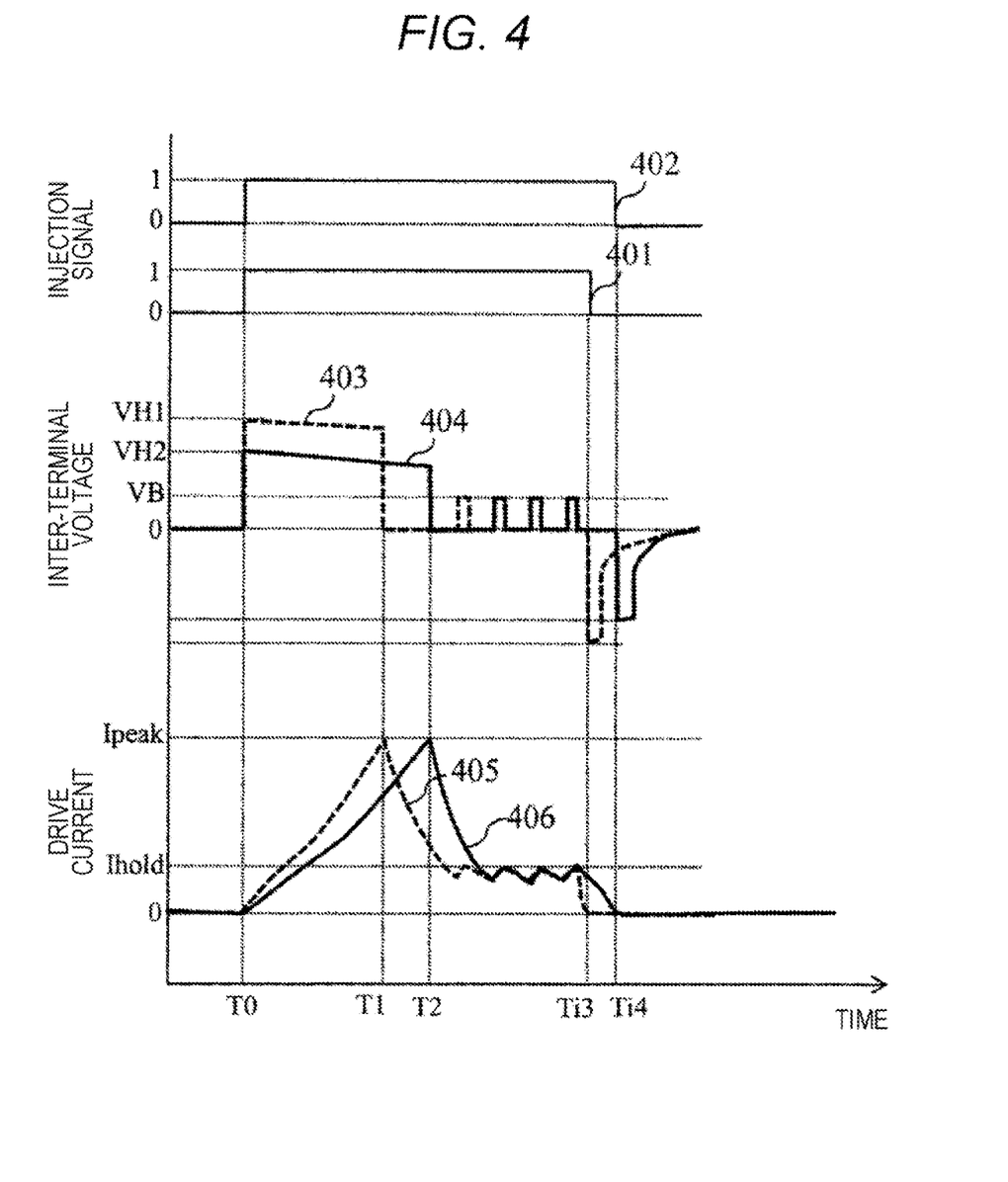
FIG. 4 is a diagram illustrating an example of the relationships among injection signals for driving the fuel injection device, drive voltages to be supplied to the fuel injection device, and drive currents according to the present invention.

FIG. 4 illustrates injection signals for injecting the same fuel amount (for example, Q2 illustrated in FIG. 3), inter-terminal voltages applied to the fuel injection device 540, and drive voltage waveforms, as an example of power control for implementing the fuel injection characteristics described in FIG. 3. An injection signal 401 is an injection signal for driving the fuel injection device 101 by supplying the voltage VH1 generated by the booster circuit 514, and an injection signal 402 is an injection signal for driving the fuel injection device 101 by supplying the voltage VH2 generated by the high-voltage power source. The injection pulse widths (times) for implementing the fuel injection amount Q2 described in FIG. 3 are Ti4 and Ti3, and Ti4 is larger than Ti3.

That is, in the case of injecting the same amount of fuel from the fuel injection device 101, the vehicle control device (the ECU 104) sets the length Ti3 of the fuel injection pulse signal for supplying a drive current to the fuel injection device 101 by the battery to be shorter than the length Ti4 of the fuel injection pulse signal for supplying a drive current to the fuel injection device 101 by the high-voltage battery (the high-voltage power source 601).

With regard to the inter-terminal voltage, as described above with reference to FIGS. 2 and 3, since the supply power VH1 from booster circuit 514 is greater than the supply power VH2 from the high-voltage power source 601, the times before reaching Ipeak necessary for bringing favorably the mover 113 into the full-lift position are T1 and T2, and T1 is smaller than T2. After that, as a current control for keeping favorably the mover in the full-lift state, it is preferred to perform a switching control as described in FIG. 2 by using the battery voltage VB (or another power supply) and perform that control at the time of valve closing by applying the respective inverse voltages. Accordingly, the mover is driven by applying the inverse voltages indicated by the lines 403 and 404. As a result, the ECU 104 calculates the drive current waveforms supplied by the respective power sources in such a manner to switch between a drive current to achieve the characteristics indicated by the line 405 in the case of supplying power from the battery voltage via the booster circuit and a drive current to achieve the characteristics indicated by the line 406 in the case of supplying power from the high-voltage power source 601, or follow the characteristics described in FIG. 3.

That is, as indicated by the lines 403 and 404 of FIG. 4, in the case of injecting the same amount of fuel from the fuel injection device 101, the vehicle control device (the ECU 104) sets the energization time (404) for supplying a drive current to the fuel injection device 101 by the high-voltage battery (the high-voltage power source 601) to perform a single fuel injection to be longer than the energization time (403) for supplying a drive current to the fuel injection device 101 by the battery to perform a single fuel injection.

In one cycle of the engine (a two-rotation cycle consisting of aspiration, compression, expansion, and exhaust), the vehicle control device (the ECU 104) desirably sets the maximum number of injections per cycle for performing a plurality of fuel injections from the fuel injection device 101 with power supply from the battery to be smaller than the maximum number of injections per cycle for performing a plurality of fuel injections from the fuel injection device 101 by the high-voltage battery (the high-voltage power source 601) in one cycle.

The voltage of the power supplied from the battery through the booster circuit 514 to the fuel injection device 101 is set to be higher than the voltage of the power supplied from the high-voltage battery (the high-voltage power source 601). Accordingly, the energization time for performing a single fuel injection by the power supplied from the high-voltage battery (the high-voltage power source 601) is desirably set to be longer than the energization time for injecting the same amount of fuel by the power supplied from the battery.

In addition, the high-voltage battery (the high-voltage power source 601) is configured to supply power without the intervention of a special booster circuit or the like, and thus is unlikely to be subject to the constraints of heat generation in a circuit and charging time for voltage boosting. This makes it possible to set in the driving map the maximum number of injections with the high-voltage battery to be larger than that with the normal battery in one cycle of the engine. Further, the minimum fuel injection interval (the time between the end of one injection and the start of the next injection) with high-voltage battery can be set to be shorter than that with the normal battery.

As indicated by the lines 405 and 406 in FIG. 4, the vehicle control device (the ECU 104) controls and sets the time before reaching the peak current (Ipeak) in the case of supplying a drive current to the fuel injection device 101 by the battery to be shorter than the time before reaching the peak current in the case of supplying a drive current to the fuel injection device 101 by the high-voltage battery (the high-voltage power source 601).

The vehicle control device (the ECU 104) also controls and sets the minimum fuel injection interval for performing a plurality of fuel injections from the fuel injection device 101 by the battery in one cycle of the inter combustion engine to be longer than the minimum fuel injection interval for performing a plurality of fuel injections from the fuel injection device 101 by the high-voltage battery (the high-voltage power source 601) in one cycle. The minimum fuel injection interval refers to the time between the end of one injection and the start of the next injection from the fuel injection device 101.

This is because the voltage of the battery is 14 V or lower as described above, and the voltage of the high-voltage battery (the high-voltage power source 601) is 24 to 60 V which is equal to or lower than the voltage of the battery boosted by the booster circuit 514, and it is thus necessary to bring the mover appropriately into the full-lift position where T2 is larger than T1.

In the case of supplying a drive current to the fuel injection device 101 by the battery, the vehicle control device (the ECU 104) supplies a drive current to the fuel injection device 101 under the voltage of the battery boosted by the booster circuit 514, and in the case of supplying a drive current to the fuel injection device 101 by the high-voltage battery (the high-voltage power source 601), the vehicle control device (the ECU 104) supplies a drive current to the fuel injection device 101 under the voltage of the high-voltage battery (the high-voltage power source 601) lower than the voltage of the battery boosted by the booster circuit 514.

According to this example, it is possible to implement a drive device for a fuel injection device to implement optimum multiple-stage injection controls in the wide operating range of the engine, thereby reducing favorably the fuel consumption and exhaust emission of the engine.

REFERENCE SIGNS LIST 101 fuel injection device (fuel injection valve)
103 drive circuit
104 ECU
105 drive device
106 solenoid
111 communication line
501 CPU
502 drive IC
502, 505, 506, 507 switching element
600 switch
VB battery voltage source

The invention claimed is:

1. A vehicle control device installed in a vehicle, the device comprising:
   a battery operably coupled to a booster circuit that boosts a voltage of the battery to provide a boosted voltage;
   a high-voltage battery that has a voltage higher than a voltage of the battery;
   a fuel injection device that injects fuel into an internal combustion engine;
   a processor configured to control the fuel injection device and to determine whether to supply a drive current to the fuel injection device via the boosted circuit or via the high-voltage battery based on an engine operating condition by controlling a switch, the switch is provided downstream of the booster circuit; and
   wherein when the engine operating condition is a multi-stage fuel injection, the processor determines to supply the drive current via the high-voltage battery to reduce a reliance on the booster circuit.

2. The vehicle control device according to claim 1, wherein
   the processor is configured to control the switch that switches between supplying the drive current to the fuel injection device via the boosted circuit and supplying the drive current to the fuel injection device by the high-voltage battery.

3. The vehicle control device according to claim 1, wherein
   the processor is configured to control the fuel injection device by driving maps different between a fuel injection pulse signal for supplying the drive current to the fuel injection device via the boosted voltage and a fuel injection pulse signal for supplying a drive current to the fuel injection device by the high-voltage battery.

4. The vehicle control device according to claim 1, wherein
   in the case of injecting the same amount of fuel from the fuel injection device, the processor is configured to set length of a fuel injection pulse signal for supplying the drive current to the fuel injection device via the boosted voltage to be longer than length of a fuel injection pulse signal for supplying the drive current to the fuel injection device by the high-voltage battery.

5. The vehicle control device according to claim 1, wherein
   in the case of injecting the same amount of fuel from the fuel injection device, the processor is configured to set energization time for supplying a drive current to the fuel injection device by the high-voltage battery to perform a single fuel injection to be longer than energization time for supplying a drive current to the fuel injection device via the boosted voltage to perform a single fuel injection.

6. The vehicle control device according to claim 1, wherein the processor is configured to set the maximum number of injections in one engine cycle for performing a plurality of fuel injections from the fuel injection device in the one cycle by power from the boosted voltage to be smaller than the maximum number of injections in the one cycle for performing a plurality of fuel injections from the fuel injection device in the one cycle by power from the high-voltage battery.

7. The vehicle control device according to claim 1, wherein the processor is configured to set time before reaching a peak current for supplying a drive current to the fuel injection device via the boosted voltage to be shorter than time before reaching a peak current for supplying a drive current to the fuel injection device by the high-voltage battery.

8. The vehicle control device according to claim 1, wherein the processor is configured to set a minimum fuel injection interval for performing a plurality of fuel injections from the fuel injection device in one engine cycle by power from the boosted voltage to be longer than a minimum fuel injection interval for performing a plurality of fuel injections from the fuel injection device in the one cycle by the high-voltage battery.

9. The vehicle control device according to claim 1, wherein the voltage of the battery is 14 V or less and the voltage of the high-voltage battery is 24 to 60 V.

10. The vehicle control device according to claim 1, wherein the voltage of the battery is 14 V or less and the voltage of the high-voltage battery is equal to or lower than the boosted voltage.

11. The vehicle control device according to claim 1, wherein when the processor determines to supply the drive current to the fuel injection device by the high-voltage battery, a voltage of the high-voltage battery is lower than the boosted voltage.

12. The vehicle control device according to claim 2, wherein
   in the case of injecting the same amount of fuel from the fuel injection device, the processor is configured to set energization time for supplying a drive current to the fuel injection device by the high-voltage battery to perform a single fuel injection to be longer than energization time for supplying a drive current to the fuel injection device via the boosted voltage to perform a single fuel injection.

13. The vehicle control device according to claim 2, wherein the processor is configured to set a maximum number of injections in one engine cycle for performing a plurality of fuel injections from the fuel injection device in the one cycle by power from the boosted voltage to be smaller than the maximum number of injections in the one cycle for performing a plurality of fuel injections from the fuel injection device in the one cycle by power from the high-voltage battery.

14. The vehicle control device according to claim 2, wherein the processor is configured to set a minimum fuel injection interval for performing a plurality of fuel injections from the fuel injection device in one engine cycle by power from the boosted voltage to be longer than a minimum fuel injection interval for performing a plurality of fuel injections from the fuel injection device in the one cycle by the high-voltage battery.

15. The vehicle control device according to claim 2, wherein when the processor determines to supply the drive current to the fuel injection device by the high-voltage battery, a voltage of the high-voltage battery is lower than the boosted voltage.

16. The vehicle control device according to claim 1, wherein the use of the high-voltage battery during a multi-stage fuel injection reduces the reliance on the booster circuit by reducing heat generation and adding charging time.

\* \* \* \* \*